United States Patent [19]

Locke et al.

[11] 3,810,043
[45] May 7, 1974

[54] METHOD OF OPERATING CLOSED-CYCLE CARBON DIOXIDE LASERS IN WHICH CARBON MONOXIDE IS USED TO PREVENT DEGRADATION OF PERFORMANCE

[75] Inventors: Edward V. Locke, Rockport, Mass.; Edward T. Gerry, MacLean, Va.

[73] Assignee: Avco Corporation, Cincinnati, Ohio

[22] Filed: Nov. 15, 1972

[21] Appl. No.: 306,896

[52] U.S. Cl.................................. 331/94.5, 330/4.3
[51] Int. Cl............................................. H01s 3/22
[58] Field of Search...................... 331/94.5; 330/4.3

[56] References Cited
UNITED STATES PATENTS
3,702,973  11/1972  Daugherty et al................. 331/94.5

OTHER PUBLICATIONS
Tiffany et al., Laser Focus, Sept. 1969, pp. 48–51.
Howe, Applied Physics Letters, Vol. 7, No. 1, July 1, 1965, pp. 21–22.

Primary Examiner—Ronald L. Wibert
Assistant Examiner—R. J. Webster
Attorney, Agent, or Firm—Charles M. Hogan; Melvin E. Frederick

[57] ABSTRACT

A method of operating closed-cycle carbon dioxide flowing gas lasers in which a gaseous mixture typically comprising carbon dioxide, nitrogen and helium is electrically excited to produce lasing action, wherein carbon monoxide is included in the gaseous mixture in amounts sufficient to substantially prevent degradation of performance relative to open-cycle performance.

9 Claims, 3 Drawing Figures

PATENTED MAY 7 1974 3,810,043

METHOD OF OPERATING CLOSED-CYCLE CARBON DIOXIDE LASERS IN WHICH CARBON MONOXIDE IS USED TO PREVENT DEGRADATION OF PERFORMANCE

The present invention relates to lasers and particularly electrically excited flowing gas lasers utilizing a gaseous lasing mixture of typically carbon dioxide, nitrogen and helium.

In recent years, substantial progress has been made in the development of high mass flow $CO_2$ lasers in which the laser gases flow through the working region or optical cavity in either the open or closed cycle mode.

The electrically excited convection cooled $CO_2$ laser appears to offer the greatest potential for applications requiring high average power. The very high power capability of $CO_2$ lasers (lasers however pumped using a gaseous lasing mixture of $CO_2$ typically combined with $N_2$ and He) was first demonstrated with the gas dynamic type which does not utilize electrical excitation. For a comprehensive discussion of the gas dynamic type laser, reference is made to patent application, Ser. No. 80,152 filed Oct. 12, 1970, now U.S. Pat. No. 3,713,030, assigned to the same assignee as this application. See also "Gas Dynamic Lasers" by E. T. Gerry, American Physical Society Bulletin, Series II, Vol. 15, No. 4, p. 563, April 1970 and "Performance of an Unstable Oscillator on a 30-kW cw Gas Dynamic Laser" by E. V. Locke, R. Hella and L. Westra, Avco Everett Research Laboratory, IEEE Journal of Quantum Electronics, Vol. QE-7, pp. 581–583, December 1971. However, electrically excited lasers and especially electrically excited convection cooled $CO_2$ lasers appear to be better suited than gas dynamic lasers for commercial applications such as, for example, heat treating, welding and cutting which require high power, long operting time and precise control.

Of the many types of lasers presently under development such as, for example, the HF/DF lasers and CO lasers, $CO_2$ lasers have the benefit of earlier and far greater development efforts. Further, over the past several years, research and development efforts have been concentrated on electrically excited convection cooled $CO_2$ lasers operating in the closed-gas cycle mode. Such convection lasers that utilize a single large discharge volume appear best suited for use in high power laser systems, because such lasers offer among other things a clean aerodynamic design, minimum ducting, low pressure loss in the laser channel and a uniform active medium. For a discussion of one type of such laser, reference is made to "Electrical Discharge Convection Lasers" by J. W. Davis and C. O. Brown, AIAA, Paper No. 72–722, AIAA Fifth Fluid and Plasma Dynamics Conference, June 26, 1972. For a description of another and preferred type of such a laser better suited for commercial applications, reference is made to patent application, Ser. No. 50,933 filed June 29, 1970 entitled "Electrically Excited Flowing Gas Laser and Method of Operation" in the names of James P. Reilly, now U.S. Pat. No. 3,702,973, and patent application, Ser. No. 72,982 filed Sept. 17, 1970 entitled "Laser or Ozone Generator in Which a Broad Electron Beam with a Sustainer Field Produces a Large Area, Uniform Discharge" in the names of Jack D. Daugherty, Diarmaid H. Douglas-Hamilton, Richard M. Patrick and Evan R. Pugh, now U.S. Pat. No. 3,702,973 and of common assignment with the present invention.

Because of the high-mass-flow rates of the laser gases and the large pumping capacities required for high power operation, system considerations indicate that operation is preferably in a closed-gas cycle, i.e., a mode in which the laser gases are continuously recirculated and used. However, the performance of $CO_2$ electric-discharge convection lasers operating in the closed-gas-cycle mode are degraded relative to opencycle performance levels due to reduced discharge operation and/or stability limits. This reduction in discharge power results in a concomitant reduction in the optical output capability of the laser device when operating in the preferred closed-cycle mode.

At high power levels, characterized by discharge specific powers (electrical input power per unit mass flow rate, a parameter proportional to the gas temperature rise) near the thermal limit of optical efficiency, such discharges tend to be unstable. The instability may manifest itself in the form of discharge collapse from a uniform diffused flow filling the laser channel volume into constricted arc-like filaments. Nevertheless, under open-cycle conditions, i.e., operation in which the constituent laser gases pass through the cavity and are subsequently exhausted, higher discharge specific powers approaching the thermal limit are attainable in a variety of geometries and by a variety of techniques.

Thus, in closed-cycle operation discharge instabilities have been found to set in prematurely and limit the discharge specific power to levels significantly below those characteristic of open cycle operation.

The instabilities that occur in closed-cycle operation are believed to be strongly influenced by contaminant species or decomposition products that are generated by electrochemical reaction in the discharge. Some of the contaminant gas species or decomposition products were found to be carbon monoxide, nitric oxide, and oxygen and to have a strong destabilizing or adverse effect on the discharge. Heretofore to eliminate or delay the onset of discharge instability, it has been suggested to continuously process the circulating gas to maintain a composition in which stable operation can be achieved, use configurational and operational techniques to provide discharge uniformity and/or to enhance dissipative mechanisms in the discharge plasma and lower the E/N (electric field/neutral particle density) of the discharge and thereby reduce the production rate of contaminant species. Implementation of all of the above unfortunately adds to the complexity of the laser system.

The first technique contemplates employment of a catalytic reactor in the gas-circulating system to process the gas, the second technique contemplates the use of vanes and/or supplemental RF excitation and the third technique contemplates the use of readily ionizable gas additives or the use of electron beam ionization.

The use of a readily ionizable gas to provide a high degree of ionization at a low E/N is not satisfactory since suitable materials such as cesium and mercury present difficult handling problems and may not be compatible with a closed-cycle system. Gases such as xenon which are inert do not offer a sufficient reduction in E/N. For a more detailed discussion, reference is made to the aforementioned Davis et al paper.

We have found, however, that electron beam ionization per se does not offer a complete solution because the discharge characteristics thereof deteriorate after several seconds of operation as disclosed in greater detail hereinafter.

Thus, heretofore, in electron beam lasers of the type disclosed in the aforementioned patent application, Ser. No. 72,982, after a period of time of approximately 2-3 seconds, the amount of current flowing in the sustainer circuit was found to decrease considerably for a given applied voltage. Increasing this current by increasing the voltage was found to be unsatisfactory since this generally resulted in the production of discharge instabilities.

If a make-up gas is provided, the decrease in current and output power will continue for a short period of time and then level off at the point at which the system reaches a steady state.

In accordance with the present invention, degradation of the performance of closed-cycle $CO_2$ two-step electric-discharge convection lasers of the type disclosed in said U.S. Pat. Nos. 3,702,973 and 3,721,915 is reduced if not eliminated by the provision of a small amount of carbon monoxide. In operation of an electron beam laser of the type described in the aforementioned U.S. Pat. No. 3,702,973, the introduction in a gaseous mixture of carbon dioxide, nitrogen and helium of a small amount of carbon monoxide, degradation was substantially reduced with a resulting uniformity in output power. In fact, in one case when the sustainer voltage was increased slightly during the first few seconds or so of operation in order to maintain the sustainer current constant, laser output power actually increased as a function of timer rather than markedly decreasing as it does in the absence of the addition of carbon monoxide.

It is an object of the present invention to provide a method of operating two-step electrically excited carbon dioxide lasers.

It is another object of the present invention to provide a method of producing improved laser action in a two-step electrically excited flow gas.

It is a further object of the present invention to provide a method of improving performance of two-step electrically excited closed-cycle carbon dioxide lasers.

It is a still further object of the invention to prevent degradation of performance of two-step electrically excited closed-cycle carbon dioxide lasers relative to open-cycle performance.

It is a still further object of the present invention to provide a method of operating carbon dioxide electrical discharge convection lasers operating in the closed-cycle mode comprising use of electron beam ionization control to provide E/N control and inclusion of carbon monoxide as a component of the lasing gas.

A still further object of the invention is the provision of a method of operating two-step electrically excited carbon dioxide electrical discharge convection lasers operating in the closed-cycle mode wherein the threshold for instability onset is extended to higher power levels relative to open cycle operation.

The novel features that are considered characteristic of the invention are set forth in the appended claims; the invention itself, however, both as to its organization and method of operation, together with additional objects and advantages thereof, will best be understood from the following description of a specific embodiment, when read in conjunction with the accompanying drawings, in which:

Figure 1:
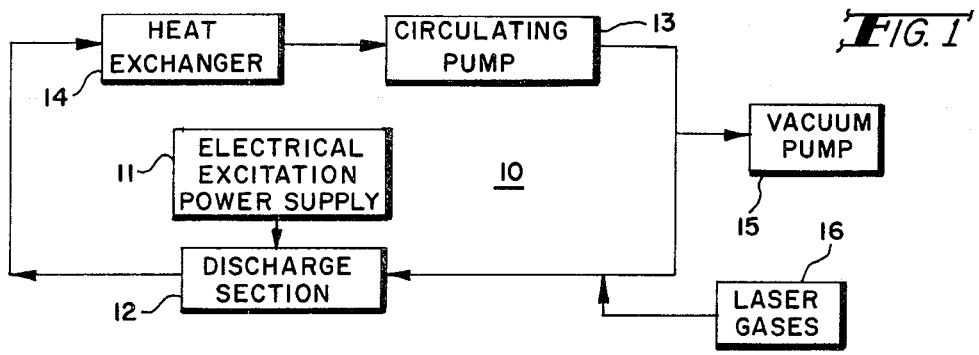
FIG. 1 is a schematic illustration of a closed-cycle laser system operable in accordance with the present invention.

Referring to FIG. 1, there is shown in schematic form a typical closed-cycle, convection cooled electric discharge $CO_2$ laser, generally indicated by the reference character 10, operable in accordance with the present invention. Such a laser may comprise suitable electrical excitation power supply means 11 for providing an electric discharge in the discharge section 12, producing in conventional manner the desired population inversion in the laser gases flowing therethrough, circulating pump means 13 for causing the laser gases to continuously flow through the discharge section 12, heat exchanger means 14 for removing heat from the laser gases to maintain a substantially constant gas temperature in the discharge section, vacuum pump means 15 to provide the desired gas pressure, typically subatmospheric, in the discharge section, and laser gas supply means 16 for charging the closed gas flow system. To prevent undesirable buildup of contaminents, it has been found desirable to continuously remove a small portion of the mixture of laser gases by the vacuum pump 15 or other suitable pump means (not shown) and continuously supply new laser gases to the gas flow system as by the gas supply means 16 or the like, at the same rate that used gases are removed. The laser gases typically comprise $CO_2$, $N_2$ and He. In accordance with the present invention, CO is added to the prior art mixture of laser gases.

The discharge section 12 may be constructed in a variety of ways and the two-step electrical discharge produced therein in a variety of ways. One type of discharge section and method of and apparatus for producing an electrical discharge is discussed in detail in the aforementioned Reilly patent application, Ser. No. 50,933. Another and different type of discharge section and method of and apparatus for producing an electrical discharge is discussed in detail in the aforementioned Daugherty et al patent application, Ser. No. 72,982. The above-identified patent applications discuss fully the construction and operation of discharge sections forming part of $CO_2$ electric-discharge convection cooled lasers and will not be repeated here.

Figure 2:
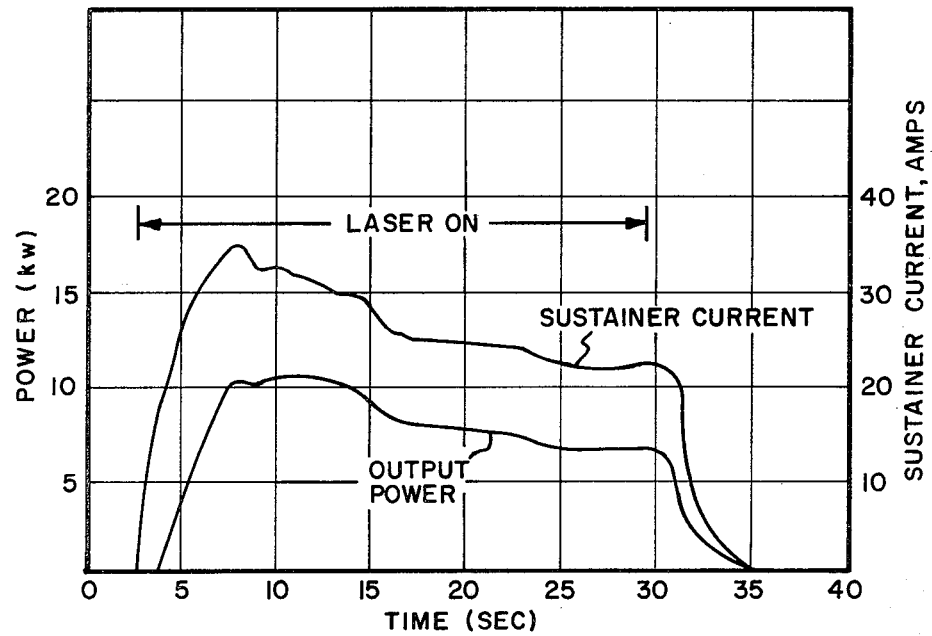
FIG. 2 is a graphic illustration of the variation of sustainer current and output power of an electron beam laser operated with prior art lasing gas mixtures.

Attention is now directed to FIG. 2 which illustrates graphically the variation of current in the sustainer circuit at constant sustainer voltage and laser output power as function of time for a $CO_2$ electron beam laser of the type disclosed in patent application, Ser. No. 72,982 and operated with conventional lasing gases ($CO_2$, $N_2$ and He). Inspection of the sustainer current and output power curves show that after a few seconds of operation, output power as well as the amount of current flowing in the sustainer circuit decreased considerably for a given constant applied electron beam and sustainer circuit voltage. Adjustment of the voltage of the sustainer circuit to provide a constant sustainer current was found to be unsatisfactory since this tended to produce instabilities in the discharge. In this particular experiment as shown in FIG. 2, the decrease in sustainer current and output power continued for a period of time and then leveled off to a more or less constant value. This leveling off is attributed to the removal of used laser gases and the provision of make-up laser gases at a rate of about ½ to 1 percent which resulted in an exchange of the laser gases in the system in about 80 seconds. Under such operating conditions, one would not expect degradation to continue beyond this period because by then the system would have reached a steady state of condition.

Figure 3:
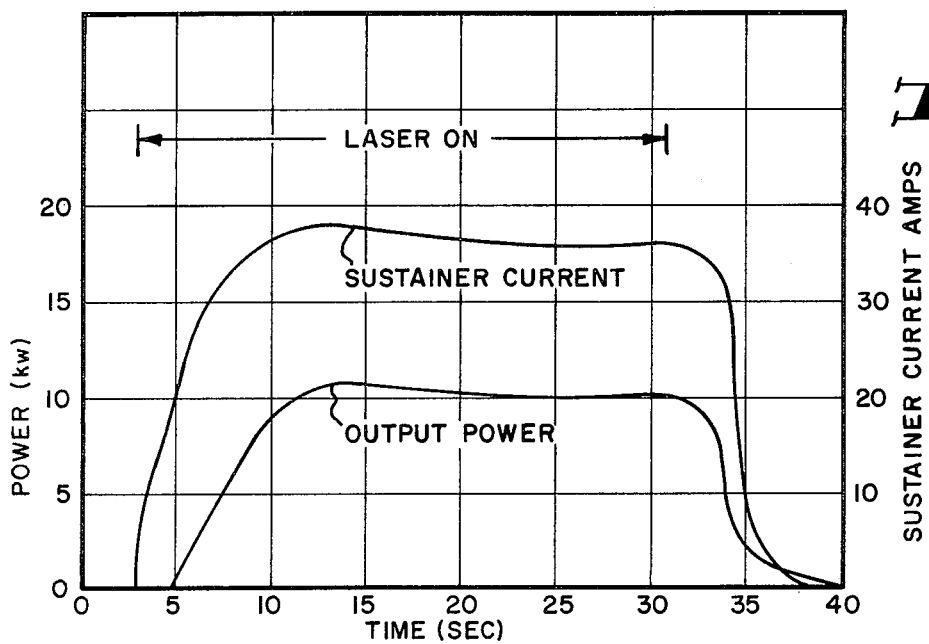
FIG. 3 is a graphic illustration of the variation of the sustainer current and output power of the electron beam laser utilizing a lasing gas mixture including CO in accordance with the present invention.

FIG. 3 is a graphic representation of sustainer current and output power for the same laser and operating conditions used to provide the data for FIG. 2, with the exception of the addition of CO to the lasing gases. Inspection of FIG. 3 will show that as compared to FIG. 2, degradation of the sustainer current and output power is considerably less, the output power being substantially uniform rather than decreasing markedly as it does in FIG. 2 in the absence of CO in the mixture of lasing gases.

In further experiments following that which provided the data for FIG. 3 using the improved mixture of lasing gases containing CO but increasing the sustainer circuit voltage to provide a constant sustainer current at the beginning of operation, an increase in output power as a function of time was noted over that previously obtained.

From the above, it will be seen that the addition of CO in closed-cycle $CO_2$ electrical discharge convection cooled lasers has a very positive influence on reducing the discharge instabilities prevalent in such closed-cycle lasers operated with prior art gas mixtures. The addition of a slight amount of CO is particularly advantageous in the operation of electron-beam lasers of the type referred to hereinabove wherein ionization is provided by an electron beam and preferably a small portion of used lasing gases is continuously removed and new make-up lasing gases supplied during operation.

In addition to providing a means of controlling E/N quite precisely, electron-beam ionization permits control of the uniformity of the discharge. In other conventional types of discharges, the voltage used must be of such a higher value in order to provide the requisite ionization for laser action, as to initiate instabilities due, for example, to the presence or production of undesirable materials having ionization potentials less than the main lasing gas.

Numerous tests were carried out in connection with the present invention involving the use of a closed-cycle $CO_2$ electron-beam laser of the type referred to hereinbefore. While it was found that a range of CO content was available, for a gas operating pressure 76 torr, optimim performance was obtained with a gas mixture (measured in percent by volume) of 50 percent He, 34 percent $N_2$, 8 percent $CO_2$ and 8 percent CO. Operation of the laser with a conventional lasing gas mixture of He, $N_2$ and $CO_2$ in the optimum amounts provided an output power of approximately 11 kW at the beginning of the test and a subsequent decrease in power after about 25 seconds to about 7kW. Use of the aforementioned gas mixture including CO in accordance with the invention resulted in the same laser providing a substantially constant output power of over 10 kW for the entire time of the test.

A further test utilizing only about 4 percent CO resulted in an increased output power over that in the absence of CO, but less than that obtained with 8 percent CO. Doubling the CO content to about 16 percent resulted in an initial power output of only about 8 KW, but no degradation of power occurred during the test.

As may be seen from the above, a range of CO content is available with an optimim value intermediate the high and low limits, the optimum value depending on laser operating parameters.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

We claim:

1. In the improved method of operating flowing gas laser devices operating in the closed cycle mode wherein output power is maintained substantially constant over extended periods of time, the steps comprising:
   a. causing a lasable gaseous medium comprising a mixture of active gases to be recirculated through a working region where a population inversion is produced, said active gases comprising carbon dioxide, nitrogen and helium;
   b. exciting said medium in said working region to produce a population inversion by causing an electrical discharge to be maintained in said medium in said working region by separately ionizing said medium and then applying a voltage across said medium to initially produce a substantially predetermined current flow through said medium in said working region;
   c. providing as a constituent of said medium carbon monoxide in an amount of excess of that generated by electrochemical reaction in said discharge and sufficient to maintain said current flow and output power substantially constant over said extended periods of time; and
   d. stimulating emission of radiation from said medium.

2. The method as defined in claim 1 wherein the amount of carbon monoxide is about eight percent by volume.

3. The method as defined in claim 1 wherein the amount of carbon monoxide is not greater than about sixteen percent by volume.

4. The method as defined in claim 1 wherein said carbon dioxide is in the amount of about eight percent by volume, said nitrogen is in the amount of about thirty-four percent by volume, said helium is in the amount of about fifty percent by volume, and said carbon monoxide is in the amount of about eight percent by volume.

5. In the improved method of operating flowing gas laser devices operating in the closed cycle mode wherein output power is maintained substantially constant over extended periods of time, the steps comprising:
   a. causing a lasable gaseous medium comprising a mixture of active gases to be recirculated through a working region where a population inversion is produced, said active gases comprising carbon dioxide, nitrogen and helium;

b. generating in said medium in said working region a substantially spatially uniform density of free electrons having an average energy insufficient to produce a population inversion in said medium;

c. providing a sustainer electric discharge in said working region for providing an electron temperature effective to increase the average energy of said free electrons to a level sufficient to produce a population inversion in said medium; d. providing as a constituent of said medium carbon monoxide in an amount in excess of that generated by electrochemical reaction is said discharge and sufficient to maintain current flow in said discharge and output power substantially constant over said extended periods of time; and e. stimulating emission of radiation from said medium.

6. The method as defined in claim 5 wherein said carbon monoxide is provided in an amount not greater than about sixteen percent by volume.

7. The method as defined in claim 6 wherein a portion of said gaseous lasing medium is continuously replaced.

8. In the improved method of operating flowing gas laser devices operating in the closed cycle mode wherein output power is maintained substantially constant over extended periods of time, the steps comprising:

a. causing a lasable gaseous lasing medium comprising a mixture of active gases to be recirculated through a working region disposed in a cavity having imperforate walls for confining said medium, said active gases comprising carbon dioxide, nitrogen and helium;

b. generating ionizing radiation externally of said cavity;

c. introducing said ionizing radiation into said cavity through one of said walls to produce a substantially spatially uniform density of free electrons in said medium having an average energy insufficient to produce a population inversion in said medium;

d. providing a sustainer electric discharge in said working region for providing an electron temperature effective to increase the average energy of said free electrons to a level sufficient to produce a population inversion of said medium;

e. providing as a constituent of said medium carbon monoxide in an amount in excess of that generated by electrochemical reaction in said discharge and sufficient to maintain current flow in said discharge and output power substantially constant over said extended periods of time; and f. stimulating emission of radiation from said medium.

9. The method as defined in claim 8 wherein a portion of said gaseous lasing medium is continuously replaced.

* * * * *

UNITED STATES PATENT OFFICE
CERTIFICATE OF CORRECTION

Patent No. 3,810,043            Dated May 7, 1974

Inventor(s) Edward V. Locke and Edward T. Gerry

It is certified that error appears in the above-identified patent and that said Letters Patent are hereby corrected as shown below:

Column 1, line 38, for "operting", read --operating--; Column 2, lines 10 and 11, for "opency-cle", read --open-cycle--; Column 3, line 42, for "flow", read --flowing--; Column 5, line 8, for "1/2 to 1", read --1/2 of 1--; and Column 6, line 41, for "of" (first occurrence), read --in--.

Signed and sealed this 1st day of October 1974.

(SEAL)
Attest:

McCOY M. GIBSON JR.            C. MARSHALL DANN
Attesting Officer                Commissioner of Patents